US009916389B2

(12) United States Patent
Attili et al.

(10) Patent No.: US 9,916,389 B2
(45) Date of Patent: *Mar. 13, 2018

(54) DYNAMIC DATA COLLECTION

(71) Applicant: International Business Machines Corporation, Armonk, NY (US)

(72) Inventors: Srinivas Attili, Sterling, VA (US); Ajay A. Divekar, Centreville, VA (US); Srinivas Jujjuru, Vienna, VA (US); Pradeep Miglani, Brambleton, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,513

(22) Filed: Jun. 14, 2016

(65) Prior Publication Data

US 2016/0292293 A1 Oct. 6, 2016

Related U.S. Application Data

(63) Continuation of application No. 11/385,585, filed on Mar. 21, 2006, now Pat. No. 9,390,157.

(51) Int. Cl.
*G06F 17/30* (2006.01)
*G06F 9/44* (2018.01)

(52) U.S. Cl.
CPC ...... *G06F 17/30893* (2013.01); *G06F 9/4443* (2013.01); *G06F 17/30333* (2013.01); *G06F 17/30339* (2013.01); *G06F 17/30592* (2013.01)

(58) Field of Classification Search
CPC ............. G06F 17/30592; G06F 9/4443; G06F 17/30893
See application file for complete search history.

(56) References Cited

U.S. PATENT DOCUMENTS 5,950,169 A 9/1999 Borghesi et al.
6,369,836 B1 * 4/2002 Larson ............... G05B 19/0426
715/763

(Continued)

FOREIGN PATENT DOCUMENTS

JP 2002182912 12/2000
WO WO 0171566 9/2001

OTHER PUBLICATIONS

Office Action (Mar. 14, 2008) for U.S. Appl. No. 11/385,585, filed Mar. 21, 2006.

(Continued)

*Primary Examiner* — Alexey Shmatov
(74) *Attorney, Agent, or Firm* — Schmeiser, Olsen & Watts, LLP; John Pivnichny

(57) ABSTRACT

A method and system. A framework, which is generated, is a table including N+1 columns and M+1 rows. A two-dimensional array within the table includes N×M intersections of the N remaining columns and the M remaining rows. A first row of the table identifies a filter including a list of K dimensions consisting of K dependent variables, and wherein N, M and K are each an integer of at least 2. The framework is transmitted to an end-user. A user-defined data collection tool is received and includes the table with the N×M intersections in the table each containing a measure of a dependent variable selected by the end-user independently from the K dependent variables. The dependent variable for each intersection is a function of the two dependent variables characterizing each intersection.

17 Claims, 16 Drawing Sheets

(56) References Cited

U.S. PATENT DOCUMENTS

| | | |
|---|---|---|
| 6,707,454 B1 | 3/2004 | Barg et al. |
| 7,409,710 B1 | 8/2008 | Uchil et al. |
| 7,546,576 B2 | 6/2009 | Egli |
| 7,779,352 B1 | 8/2010 | Underwood et al. |
| 2001/0037490 A1 | 11/2001 | Chiang |
| 2004/0111424 A1 | 6/2004 | Roman et al. |
| 2007/0226236 A1 | 9/2007 | Attili et al. |

OTHER PUBLICATIONS

Amendment (Jul. 30, 2008) for U.S. Appl. No. 11/385,585, filed Mar. 21, 2006.
Final Office Action (Nov. 10, 2008) for U.S. Appl. No. 11/385,585, filed Mar. 21, 2006.
Final Amendment (Feb. 10, 2009) for U.S. Appl. No. 11/385,585, filed Mar. 21, 2006.
Advisory Action (Feb. 24, 2009) for U.S. Appl. No. 11/385,585, filed Mar. 21, 2006.
RCE (Jan. 20, 2010) for U.S. Appl. No. 11/385,585, filed Mar. 21, 2006.
Office Action (Jun. 7, 2010) for U.S. Appl. No. 11/385,585, filed Mar. 21, 2006.
Amendment (Sep. 7, 2010) for U.S. Appl. No. 11/385,585, filed Mar. 21, 2006.
Final Office Action (Nov. 22, 2010) for U.S. Appl. No. 11/385,585, filed Mar. 21, 2006.
Decision on Appeal (Dec. 14, 2015) for U.S. Appl. No. 11/385,585, filed Mar. 21, 2006.
Examiner's Answer (Aug. 1, 2013) for U.S. Appl. No. 11/385,585, filed Mar. 21, 2006.
Appeal Brief (Feb. 13, 2013) for U.S. Appl. No. 11/385,585, filed Mar. 21, 2006.
Notice of Appeal (Feb. 13, 2013) for U.S. Appl. No. 11/385,585, filed Mar. 21, 2006.
Final Office Action (Nov. 14, 2012) for U.S. Appl. No. 11/385,585, filed Mar. 21, 2006.
Amendment (Aug. 8, 2012) for U.S. Appl. No. 11/385,585, filed Mar. 21, 2006.
Office Action (May 8, 2012) for U.S. Appl. No. 11/385,585, filed Mar. 21, 2006.
Appeal Brief (Feb. 15, 2012) for U.S. Appl. No. 11/385,585, filed Mar. 21, 2006.
Notice of Appeal (Dec. 14, 2011) for U.S. Appl. No. 11/385,585, filed Mar. 21, 2006.
Final Office Action (Sep. 14, 2011) for U.S. Appl. No. 11/385,585, filed Mar. 21, 2006.
Amendment (Jun. 30, 2011) for U.S. Appl. No. 11/385,585, filed Mar. 21, 2006.
Office Action (Mar. 31, 2011) for U.S. Appl. No. 11/385,585, filed Mar. 21, 2006.
RCE (Feb. 18, 2011) for U.S. Appl. No. 11/385,585, filed Mar. 21, 2006.
Notice of Allowance (Mar. 14, 2008) for U.S. Appl. No. 11/385,585, filed Mar. 21, 2006.
RCE (Feb. 10, 2016) for U.S. Appl. No. 11/385,585, filed Mar. 21, 2006.
Notice of Allowance (Apr. 12, 2016) for U.S. Appl. No. 11/385,585, filed Mar. 21, 2006.

\* cited by examiner

|   | A<br>E | B<br>E |
|---|---|---|
| C<br>F | AC(E)F | BC(E)F |
| D<br>F | AD(E)F | BD(E)F |

A, B, C, D, E AND F ARE DIMENSIONS (DATA DESCRIPTORS)
E IS A FILTER (END-USER SELECTED)
F FIXES DIMENSIONS (FIXED BY ADMINISTRATOR)

FIG. 1a

| 1 | Car Make | Level 1: Toyota, Honda, GM, Hyundai, Ford |
|   |          | Level 2: Camry, Corolla, Accord, Civic, Escort |
| 2 | Engine Type | Level 1: V4, V6, V8 |
| 3 | Color | Level 1: Dark, Light |
|   |       | Level 2: Red, Black, Blue, Yellow, White, Black |
| 4 | Area | Level 1: America, Europe, Asia, Australia |
|   |      | Level 2: USA, Japan, England, China, India |
|   |      | Level 3: VA, MD, DC, NJ, PA, AP, TN |
| 5 | Period | Level 1: 2001, 2002, 2003, 2004, 2005, 2006 |
|   |        | Level 2: Spring, Summer, Fall, Winter |
|   |        | Level 3: Jan, Feb, Mar, Apr, May, June |

|   | A<br>E | B<br>E |
|---|---|---|
| C<br>F | NAVAL BASE IN HAWAII<br>LABOR COSTS FOR 2005 | ARMY FORT IN HAWAII<br>EQUIPMENT COSTS IN 2005 |
| D<br>F | NAVAL BASE IN CALIFORNIA<br>EQUIPMENT COSTS FOR 2005 | ARMY FORT IN CALIFORNIA<br>EXPENDABLE ITEM COSTS IN 2005 |

A = NAVAL BASE
B = ARMY FORT
C = LOCATION 1 – HAWAII
D = LOCATION 2 – CALIFORNIA
E IS CHOSEN BY THE END-USER FROM THE DIMENSIONS (LABOR COSTS; EQUIPMENT COSTS; EXPENDABLE ITEM COSTS)
F IS FIXED BY THE DATA COLLECTION TOOL ADMINISTRATOR AS BEING THE DIMENSION ' "YEAR 2005"

101b

|   | A E ($2,000,000,000) | B E ($1,000,000,000) |
|---|---|---|
| C<br>F | $20,000,000 | $600,000,000 |
| D<br>F | $800,000,000 | $4,000,000 |

FIG. 1b

PERIOD   2005
COLOR    RED

104a

|  | TOYOTA | TOYOTA | FORD | GM | HYUNDAI | HYUNDAI |
|---|---|---|---|---|---|---|
|  | V6 | V4 | V4 | V4 | V4 | V6 |
| AMERICAN |  |  |  |  |  |  |
| ASIA |  |  |  |  |  |  |
| EUROPE |  |  |  |  |  |  |
| AUSTRALIA |  |  |  |  |  |  |

104b

|  | CAMRY | CAMRY | ACCORD | CIVIC | MUSTANG | SONATA | HIGHLANDER | HIGHLANDER | ESCORT | ESCORT |
|---|---|---|---|---|---|---|---|---|---|---|
|  | V6 | V4 | V4 | V6 | V4 | V6 | V4 | V6 | V6 | V4 |
| AMERICAN |  |  |  |  |  |  |  |  |  |  |
| ASIA |  |  |  |  |  |  |  |  |  |  |
| EUROPE |  |  |  |  |  |  |  |  |  |  |
| AUSTRALIA |  |  |  |  |  |  |  |  |  |  |

104c

|  | TOYOTA | TOYOTA | FORD | GM | HYUNDAI | HYUNDAI |
|---|---|---|---|---|---|---|
|  | V6 | V4 | V4 | V4 | V4 | V6 |
| USA |  |  |  |  |  |  |
| CANADA |  |  |  |  |  |  |
| ENGLAND |  |  |  |  |  |  |
| GERMANY |  |  |  |  |  |  |
| JAPAN |  |  |  |  |  |  |
| FRANCE |  |  |  |  |  |  |
| CHINA |  |  |  |  |  |  |
| INDIA |  |  |  |  |  |  |

ENGINE    V6
CAR MAKE  TOYOTA

104a

| | 2005 | 2005 | 2005 | 2005 | 2006 | 2006 | 2006 | 2006 |
|---|---|---|---|---|---|---|---|---|
| | RED | GREEN | YELLOW | RED | RED | GREEN | YELLOW |
| AMERICAN | | | | | | | | |
| ASIA | | | | | | | | |
| EUROPE | | | | | | | | |
| AUSTRALIA | | | | | | | | |

104b

| | FALL 2005 | SPR 2005 | SUM 2005 | WIN 2005 | FALL 2005 | SPR 2005 | SUM 2005 | WIN 2005 |
|---|---|---|---|---|---|---|---|---|
| | RED | RED | GREEN | RED | GREEN | YELLOW | GREEN | YELLOW |
| AMERICAN | | | | | | | | |
| ASIA | | | | | | | | |
| EUROPE | | | | | | | | |
| AUSTRALIA | | | | | | | | |

104c

| | JAN-05 | JAN-05 | FEB-05 | FEB-05 | MAR-05 | MAR-05 | APR-05 | APR-05 | MAY-05 | MAY-05 |
|---|---|---|---|---|---|---|---|---|---|---|
| | RED | GREEN | YELLOW | RED | GREEN | YELLOW | RED | GREEN | YELLOW | RED | GREEN | YELLOW |
| USA | | | | | | | | | | |
| CANADA | | | | | | | | | | |
| ENGLAND | | | | | | | | | | |
| GERMANY | | | | | | | | | | |
| JAPAN | | | | | | | | | | |
| FRANCE | | | | | | | | | | |
| CHINA | | | | | | | | | | |
| INDIA | | | | | | | | | | |

FIG. 1e

DYNAMIC DATA COLLECTION

This application is a continuation application claiming priority to Ser. No. 11/385,585, filed Mar. 21, 2006, now U.S. Pat. No. 9,390,157, issued Jul. 12, 2016.

BACKGROUND OF THE INVENTION

1. Technical Field

The present invention relates in general to the field of computers, and in particular to the web-based computer applications. Still more particularly, the present invention relates to a method and system for generating dynamic web pages used to collect data from end-users.

2. Description of the Related Art

One of the major problems associated with data management is an efficient mechanism to collect and validate data from various information providers. Without data availability and good data, the best analytical techniques in the world will fail to deliver the insight and value demanded by businesses. However, when data is not available electronically and input is needed from people who are geographically dispersed, many firms embark on implementing a custom data collection/retrieval system. That is, each collection/retrieval system is tailored for the requirements of the firm that is implementing it. Such a solution is unacceptable, as it adds excessive costs for development and maintenance of such "one off" solutions.

SUMMARY OF THE INVENTION

The present invention recognizes the need for a method for creating applications dynamically to collect data for multiple dimensions through the use of a reusable framework. Such a system should be able to accommodate several data submission schemes with a relatively short development and implementation time, and be able to collect rich and complex information by providing a user with a friendly interface for breaking complex tasks into smaller and more manageable tasks. Thus, one embodiment of the method includes the steps of defining a web-based framework of data dimensions, wherein the web-based framework is populated by an end-user with measures for data dimension intersections that are selected by the end-user, and wherein a data dimension intersection is a combination of multiple data dimensions; transmitting the web-based framework to the end-user, wherein the end-user populates the web-based framework on the fly with one or more user-selected data dimensions to create a user-defined data collection tool, and wherein the user-selected data dimensions are chosen from a plurality of data dimensions that are offered through the web-based framework; and receiving the user-defined data collection tool.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1a depicts a framework for a data collection tool;

FIG. 1b depicts the data collection tool described in FIG. 1a after being customized by an end-user;

FIG. 1c illustrates dimensions available in another exemplary framework;

FIGS. 1d-e depict data collection tools using the framework shown in FIG. 1c after being customized by the end-user;

DETAILED DESCRIPTION OF THE PREFERRED EMBODIMENT

With reference now to the figures, and in particular to FIG. 1a, there is depicted an exemplary framework 100 for a data collection tool. As depicted, framework 100 has six dimensions (A-F), which are descriptors for data that is to be collected/analyzed from and for an end-user. Furthermore, framework 100 has four intersections (combinations of dimensions), represented as AC(E)F, BC(E)F, AD(E)F and BD(E)F. Dimension E is called a "filter," and is a dimension that is defined by an end-user by selecting a dimension from a plurality of dimensions that are offered through the web-based framework 100. Dimension F is a fixed dimension, which is fixed by an administrator of the framework 100, and cannot be altered by the end-user.

An example of how framework 100 can be manipulated by an end-user is shown in FIG. 1b as user-defined data collection tool 101a. Assume that dimensions A ("Naval base"), B ("Army fort"), C ("Location 1—Hawaii") and D ("Location 2—California") are all fixed dimensions that have been fixed (set) by an administrator of framework 100. The intersection (combination of dimensions) of dimensions A and C is "Naval base in Hawaii," the intersection of dimensions A and D is "Naval base in California," the intersection of dimensions B and C is "Army fort in Hawaii," and the intersection of dimensions B and D is "Army fort in California." In addition, the intersection that includes A and C also includes dimensions E (filter dimension that includes a dimension chosen from offered data dimensions "Labor costs; Equipment costs; and Expendable item costs"). Similarly, the intersection that include A and C also includes fixed dimension F ("Year 2005"), which has been set by the framework administrator and cannot be changed. Thus, the intersection of AC(E)F is for data described as that related to a naval base in Hawaii, showing Labor costs for the year 2005. Other intersections are likewise defined and populated with measures shown in data collection tool 101b. As shown, a total dollar amount of two billion dollars was spent in naval bases in the year 2005 in Hawaii and California, and one billion dollars was spent at army forts in Hawaii and California for that same year 2005. By "drilling down" and selecting specific dimensions, the end-user is able to show that $20,000,000 was spent in 2005 at the Hawaiian naval base on labor costs, $800,000,000 was spent in 2005 on equipment at the naval base in California, $600,000,000 was spent in 2005 on equipment at the army fort in Hawaii, and $4,000,000 was spent on expendable items at the army fort in California.

Figure 1D:
Figure 1D:

FIG. 1c presents another exemplary web-based framework 102 of data dimensions. Framework 102 has five main dimensions ("Car Make," "Engine Type," "Color," "Area," and "Period") for cars. These dimensions are hierarchical, in that each can be further broken down into sub-levels as depicted. These sub-levels may be fixed or end-user selectable. For example, as shown in FIG. 1d, user-defined data collection tools 104a-c are for Red cars in the year 1005 ("Red" and "2005" are dimensions that are both fixed by the administrator). As illustrated in data collections tool 104b, the "Car Make" dimension shown in framework 102 can be expanded by selecting a sub-dimension (lower hierarchy) of the dimension "Car Make." Similarly, as shown in data collections tool 104c, the dimension "Area" can be expanded by the end-user to show particular countries, rather than continents (which are described in Level 1 of dimension "Area"). As shown in FIG. 1e, if the dimension "Engine Type" is fixed for "V6" engines, and the dimension "Car Make" is fixed for "Toyota," then the end-user can manipulate the data collection tools 106a-c according to which dimensions are selected (and at what hierarchical level, if the dimension is hierarchical).

Figure 2:
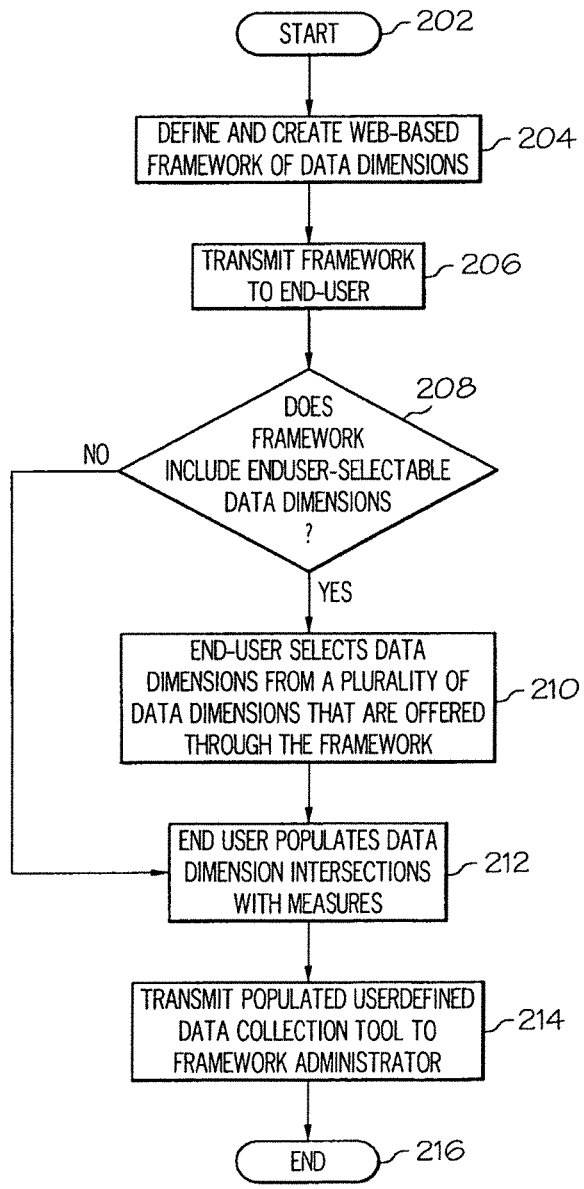
FIG. 2 is a flow-chart of exemplary steps taken in creating a web-based data collection tool.

Referring now to FIG. 2, a flow-chart of exemplary steps taken by the present invention is presented. After initiator block 202, an administrator defines and creates a web-based framework of data dimensions (block 204). These data dimensions may be hierarchical or non-hierarchical, fixed or user-selected. The framework is then transmitted to the end-user (block 206). If any of the dimensions are user-selectable (query block 208), then the end-user selects one or more dimensions from the available dimensions provided through the framework (block 210. The end-user now has now created a user-defined data collection tool, which he populates (inputs data into) with measures at the data intersections (block 212). The populated user-defined data collection tool is then transmitted back to the administrator that created the original framework (block 214), and the process ends (terminator block 216).

Note that the framework is preferably customizable using eXtensible Markup Language (XML) commands. That is, once the administrator creates the basic framework, then the dimensions (and their fixed/non-fixed hierarchical/non-hierarchical natures) are defined by XML code which allows the basic framework to be reused. By using the framework and adjustable dimensions, different end-users are able to create and populate dynamically customizable data collection tools as described herein. Note further that intersections can either be pre-defined by the framework administrator at the time of the framework upload to the end-user, or the end-user has the option to create intersections for any number of dimensions.

Figure 3:
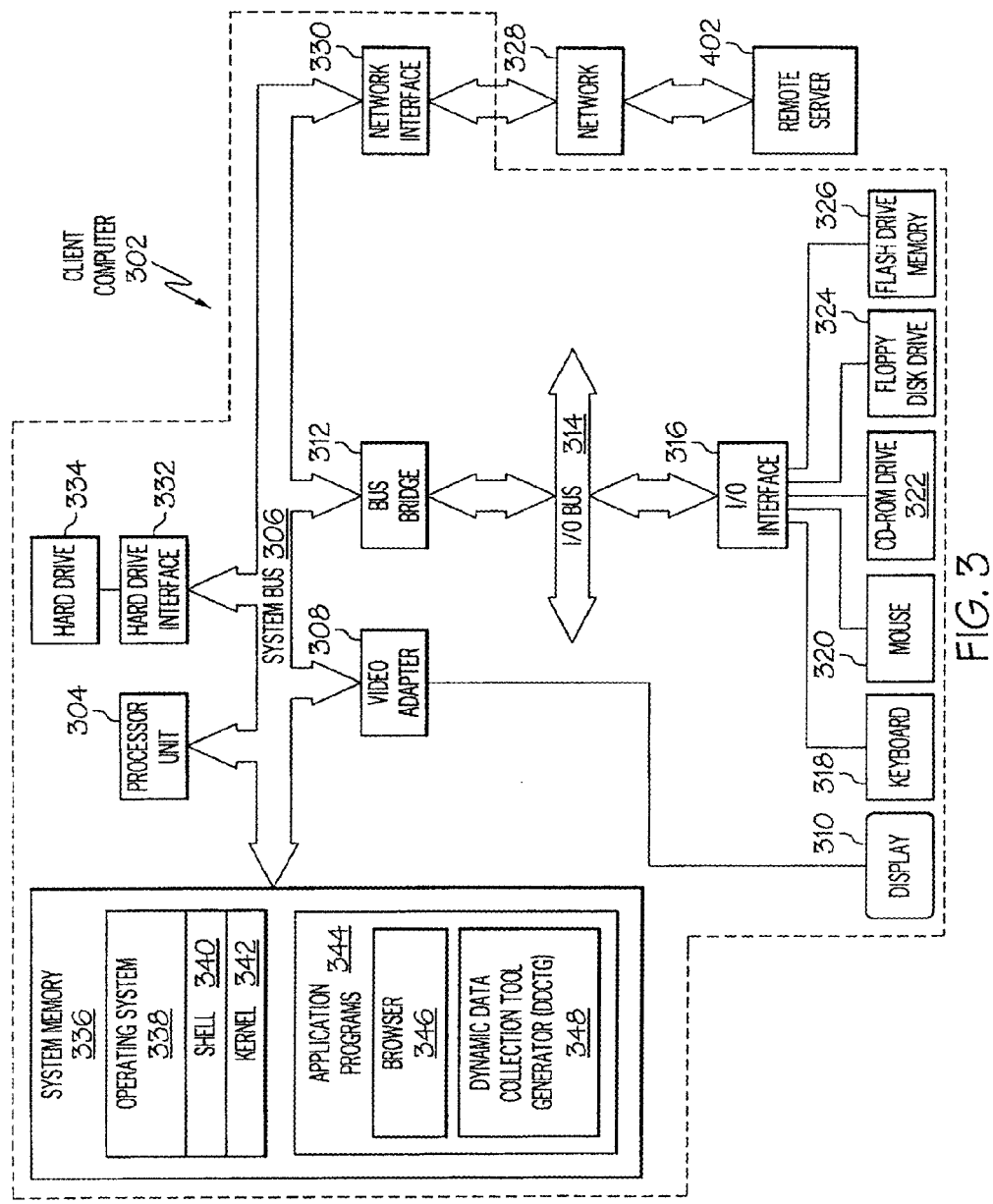
FIG. 3 depicts an exemplary client computer which can be utilized in accordance with the present invention.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 402.

Application programs 344 in Client computer 302's system memory also include a Dynamic Data Collection Tool Generator (DDCTG) 348. DDCTG 348 includes code for implementing the processes described in FIG. 2. In one embodiment, Client computer 302 is able to download DDCTG 348 from software deploying server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
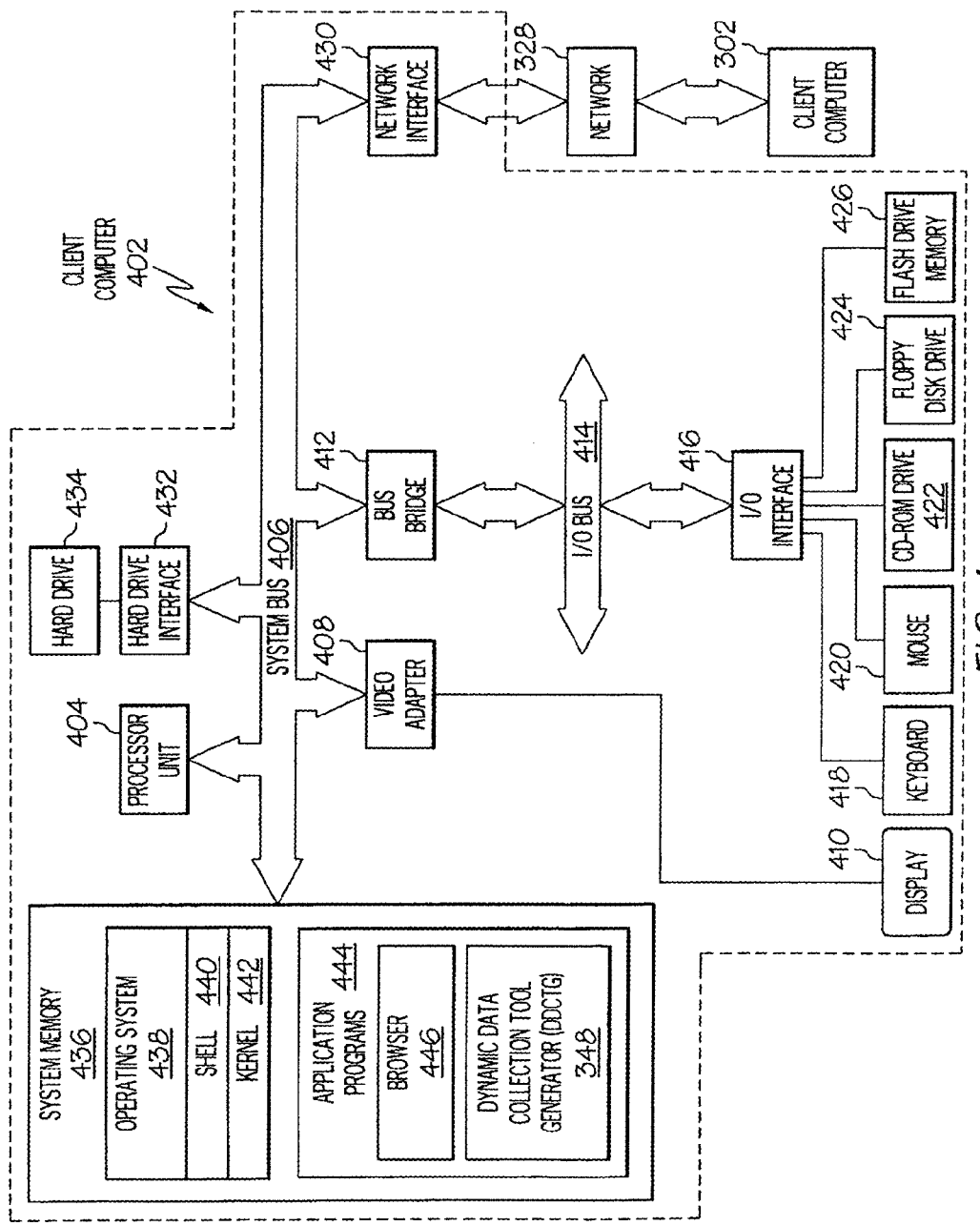
FIG. 4 illustrates a remote server that is capable of deploying software to the client computer shown in FIG. 3 to implement the present invention.

As noted above, DDCTG 348 can be downloaded to client computer 302 from software deploying server 402, shown in exemplary form in FIG. 4. Software deploying server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An UI/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Software deploying server 402 is able to communicate with client computer 302 via network 328 using a network interface 430, which is coupled to system bus 406. Access to network 328 allows software deploying server 402 to deploy DDCTG 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes software deploying server 402's operating system 438, which includes a shell 440 and a kernel 442. Shell 440 is incorporated in a higher level operating system layer and utilized for providing transparent user access to resources such as application programs 444, which include a browser 446, and a copy of DDCTG 348 described above, which can be deployed to client computer 302.

The hardware elements depicted in software deploying server 402 are not intended to be exhaustive, but rather are representative to highlight essential components required by the present invention. For instance, software deploying server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 402 performs all of the functions associated with the present invention (including execution of DDCTG 348), thus freeing Client computer 302 from having to use its own internal computing resources to execute DDCTG 348.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIG. 2, can be deployed as a process software from software deploying server 402 (shown in FIG. 4) to client computer 302 (shown in FIG. 3).

Figure 5A:
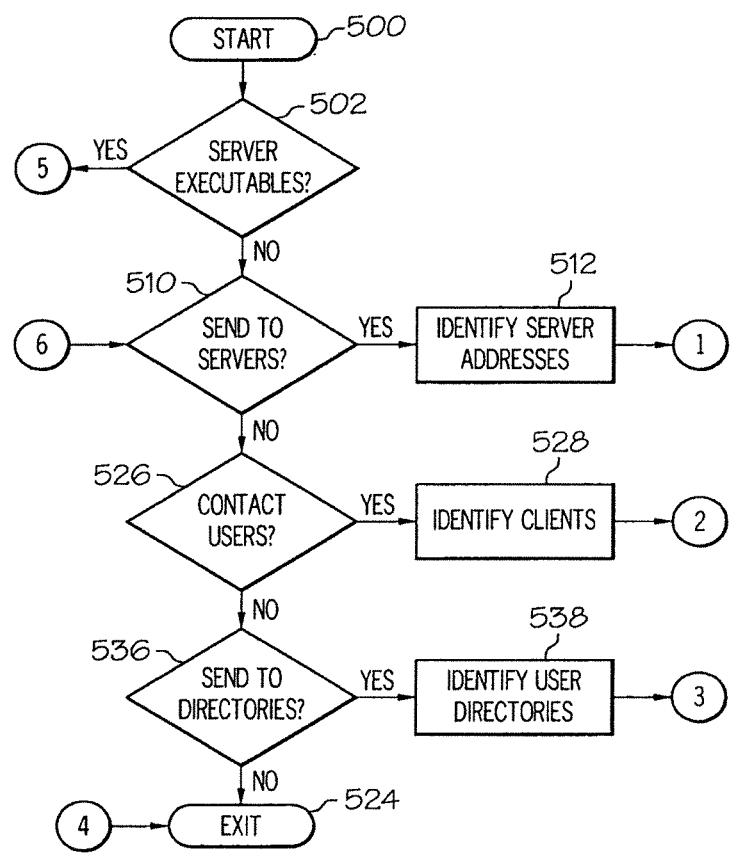
FIGS. 5a-b are flow-chart showing steps taken to deploy software capable of executing the steps shown in FIG. 2.
Figure 5B:
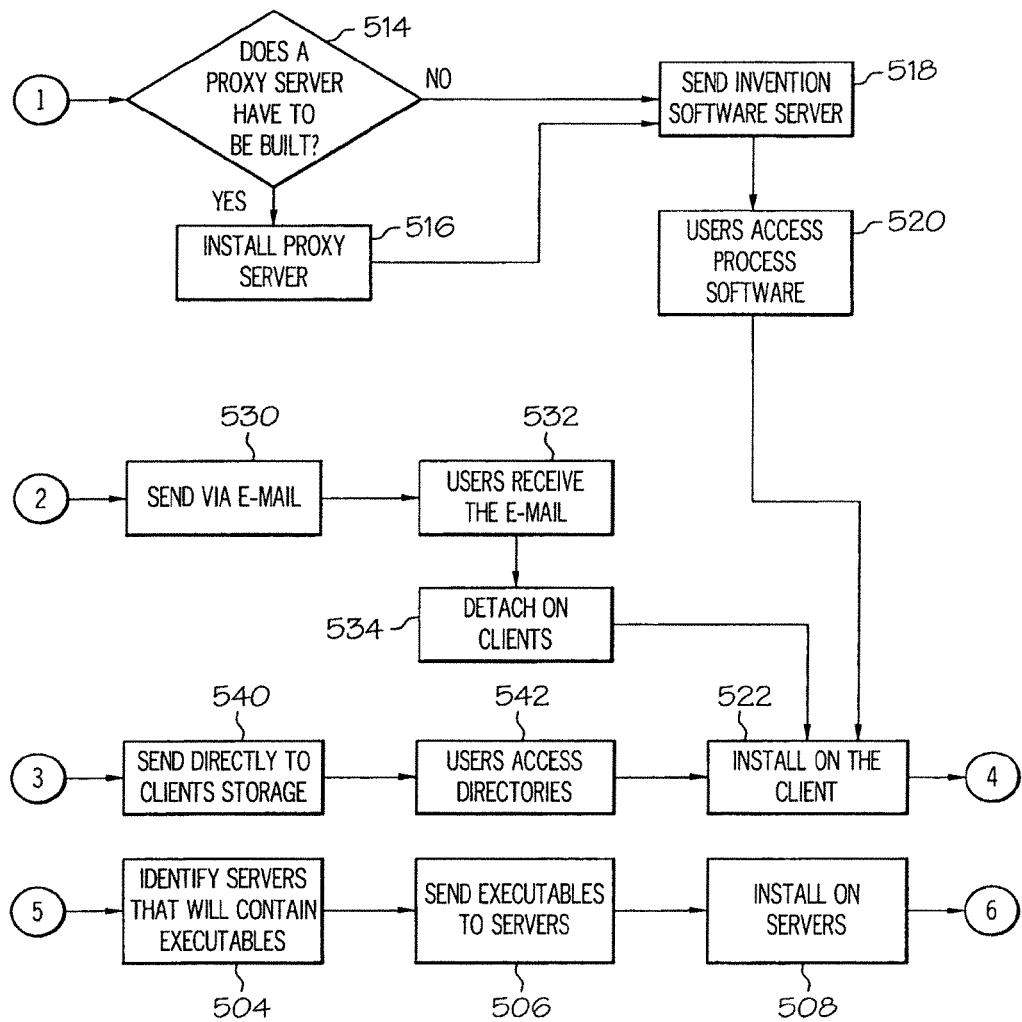

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 520). Another embodiment is to have the servers automatically copy the process software to each client and then run the installation program for the process software at each client computer. The user executes the program that installs the process software on his client computer (i.e., Client computer 302) (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether to the process software will be sent directly to user directories on their client computers (query block 536). If so, the user directories are identified (block 538). The process software is transferred directly to the user's client computer directory (block 540). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 6A:
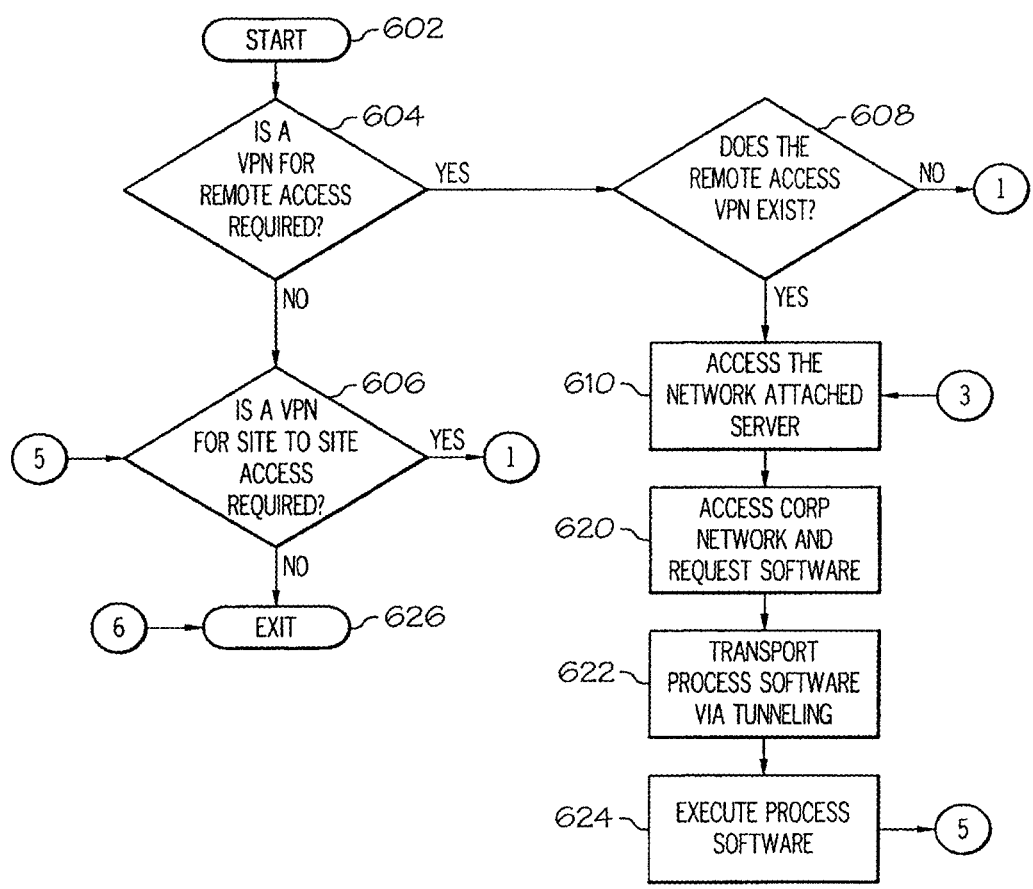
FIGS. 6a-c are flow-charts showing steps taken to deploy in a Virtual Private Network (VPN) software that is capable of executing the steps shown in FIG. 2.
Figure 6B:
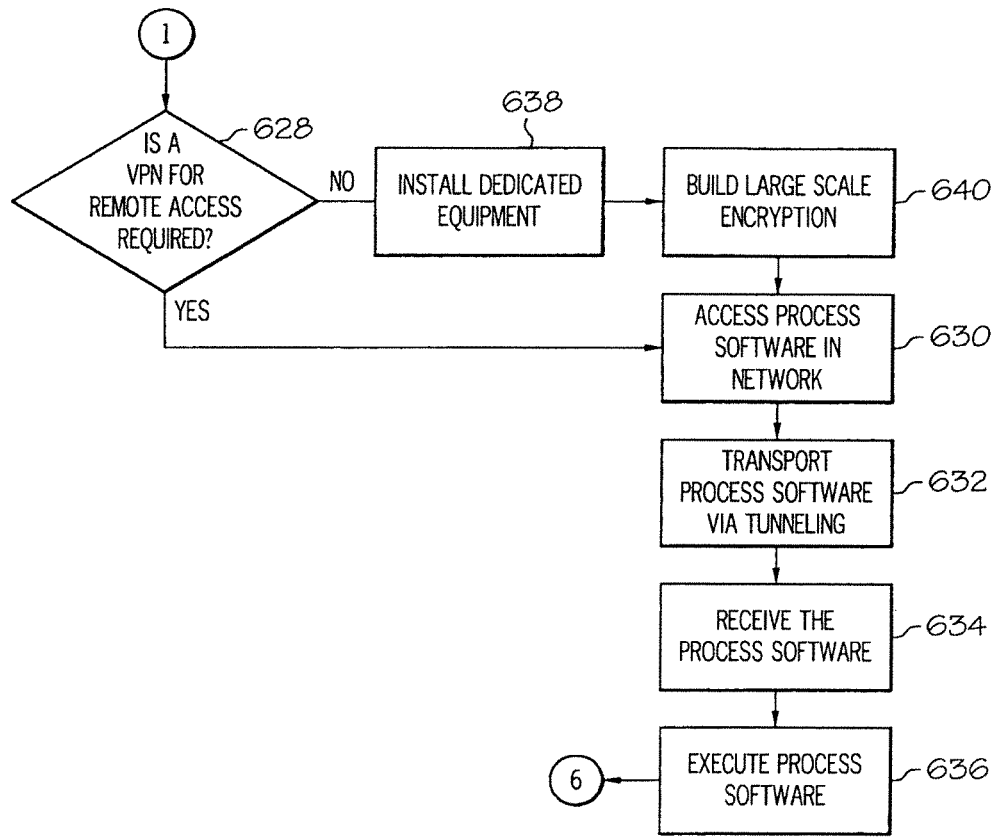
Figure 6C:
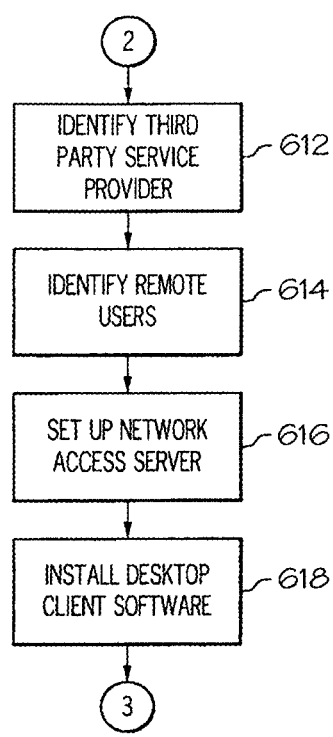

The process for such VPN deployment is described in FIG. 6. Initiator block 602 begins the Virtual Private Network (VPN) process. A determination is made to see if a VPN for remote access is required (query block 604). If it is not required, then proceed to query block 606. If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it has been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is, the process software is divided into packets and each packet including the data and protocol is placed within another packet (block 622). When the process software arrives at the remote user's desktop, it is removed from the packets, reconstituted and then is executed on the remote user's desktop (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 638). Then build the large scale encryption into the VPN (block 640).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site user's desktop (block 636). The process then ends at terminator block 626.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
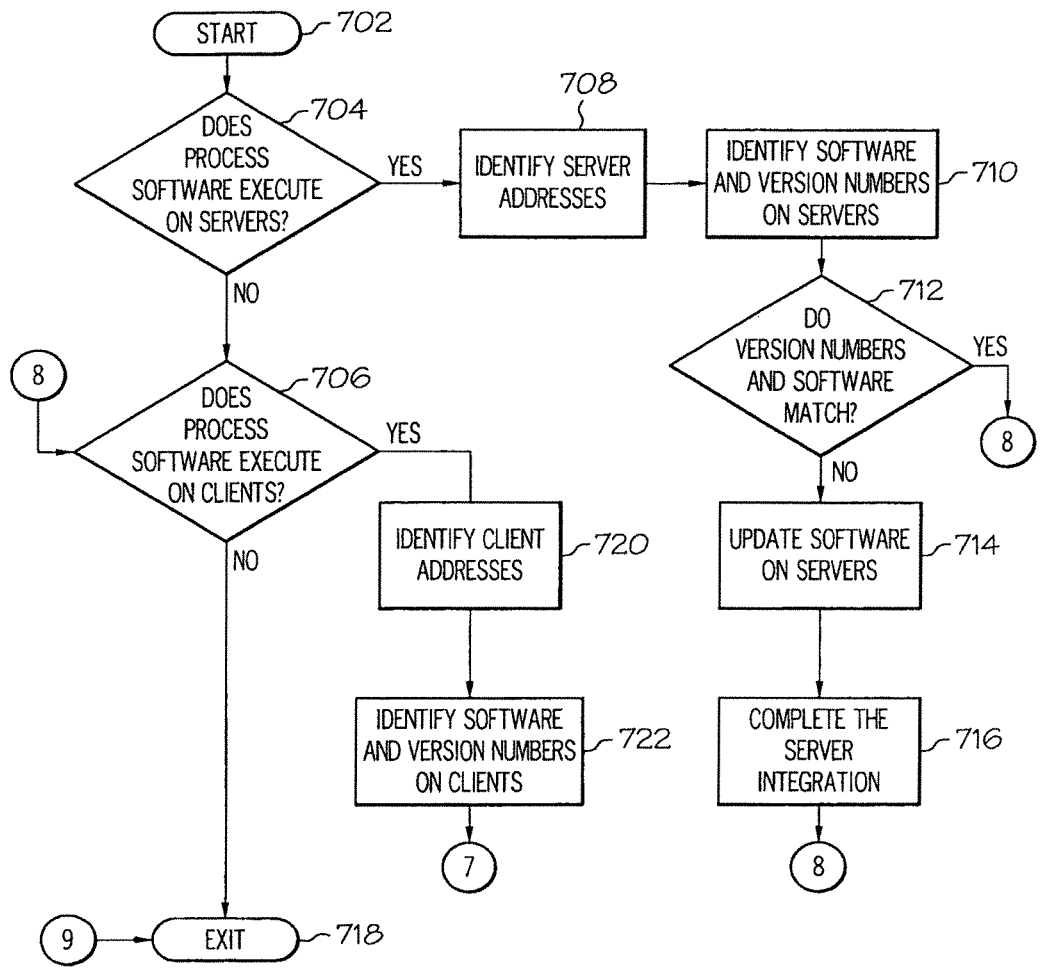
FIGS. 7a-b are flow-charts showing steps taken to integrate into an computer system software that is capable of executing the steps shown in FIG. 2.
Figure 7B:
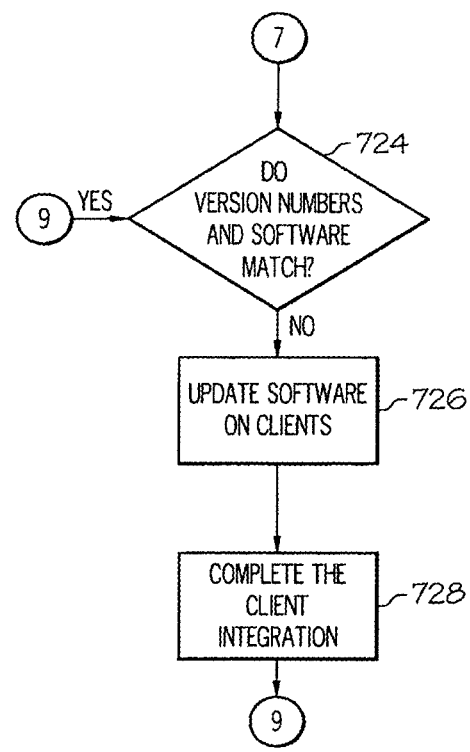

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
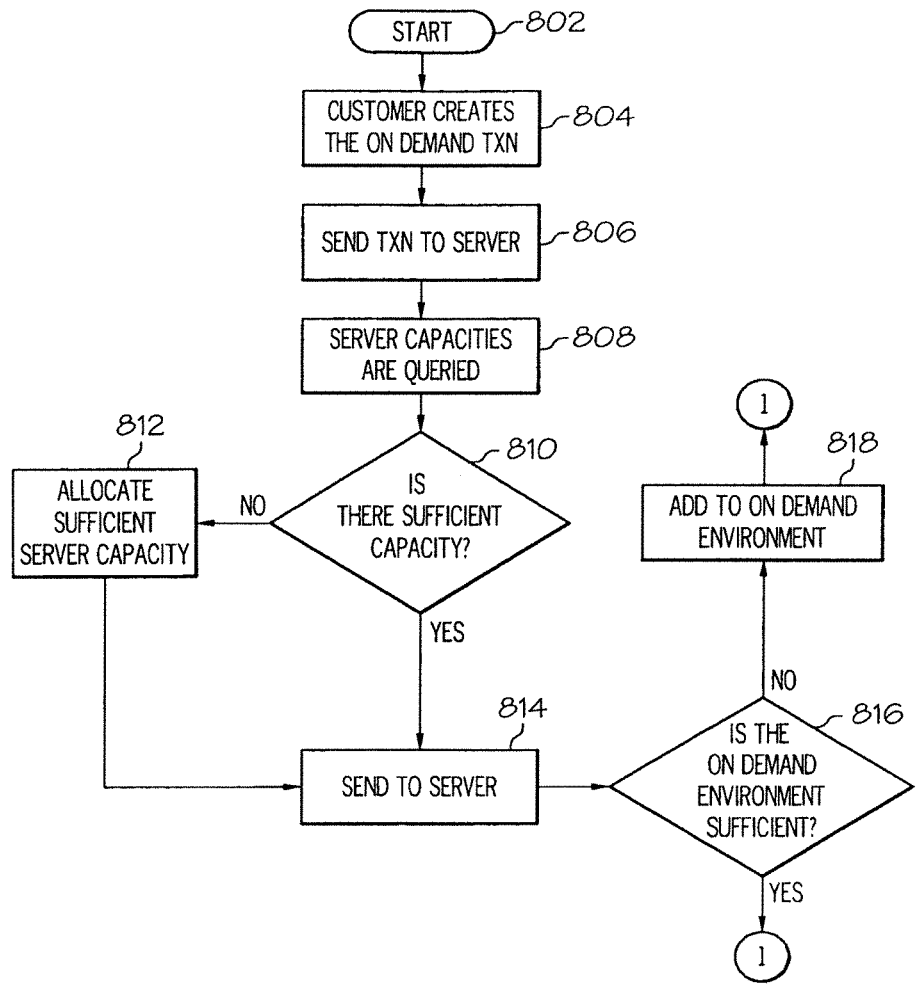
FIGS. 8a-b are flow-charts showing steps taken to execute the steps shown in FIG. 2 using an on-demand service provider.
Figure 8B:
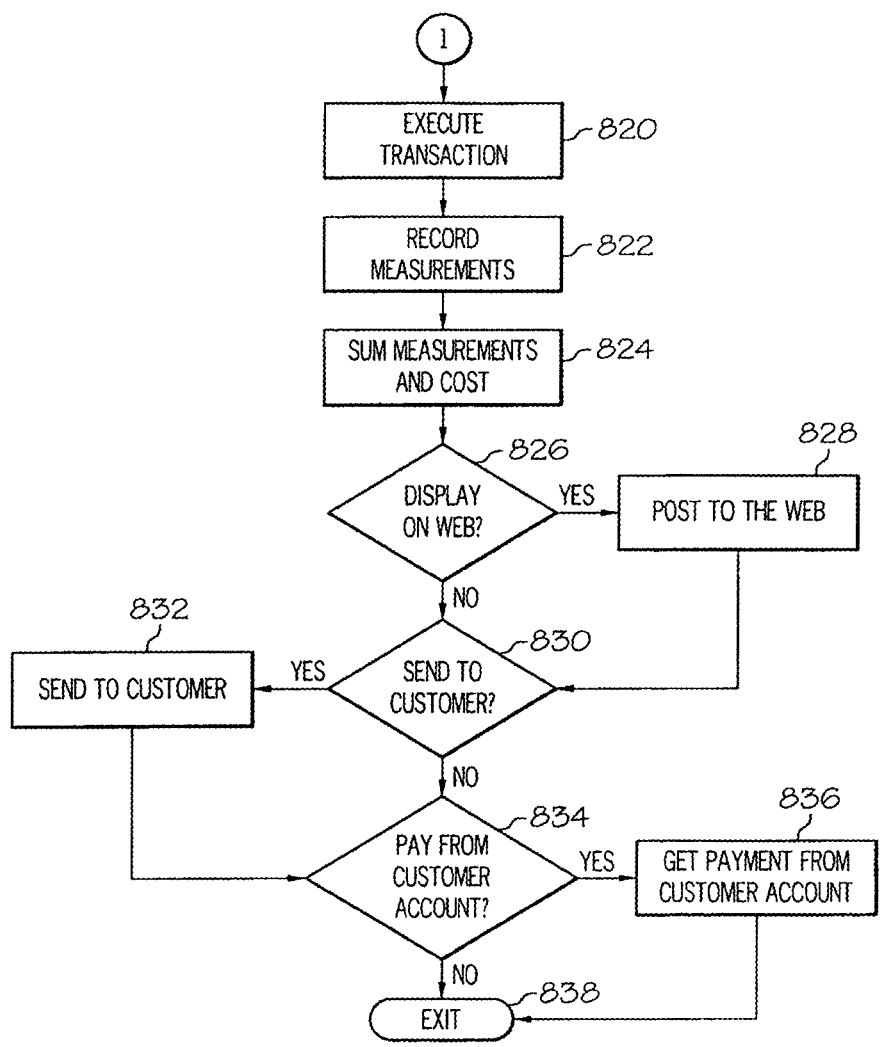

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

The present invention thus presents a method, system, and computer-useable medium for dynamically generating a web-based data collection tool. The method comprises the steps of defining a web-based framework of data dimensions, wherein the web-based framework is populated by an end-user with measures for data dimension intersections that are selected by the end-user, and wherein a data dimension intersection is a combination of multiple data dimensions; transmitting the web-based framework to the end-user, wherein the end-user populates the web-based framework with one or more user-selected data dimensions to create a user-defined data collection tool, and wherein the user-selected data dimensions are chosen from a plurality of data dimensions that are offered through the web-based framework; and receiving the user-defined data collection tool. The data dimensions may be hierarchical or non-hierarchical. In one embodiment, one or more of the data dimensions are fixed by a framework administrator, such that the end-user is unable to change those fixed data dimensions in the user-defined data collection program. Furthermore, a measure, which is used by the end-user to populate a data dimension intersection, may be either a percentage of or a monetary amount expenditure costs allocated to that data dimension.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method, said method comprising:
  generating, by a processor of a server computer of a computer system, a web-based framework, wherein the web-based framework is a table comprising N+1 columns and M+1 rows, wherein the N+1 columns comprises a first column and N remaining columns, wherein the M+1 rows comprises a first row and M remaining rows, wherein the first row identifies N dimensions consisting of N independent variables respectively associated with the N columns, wherein the first column identifies M dimensions consisting of M independent variables respectively associated with the M rows, wherein a two-dimensional array within the table comprises N×M intersections of the N remaining columns and the M remaining rows, wherein each intersection is characterized by two independent variables consisting of the independent variable of the column and the independent variable of the row defining each intersection, wherein the first row further identifies a customizable filter comprising a list of K dimensions consisting of K dependent variables, wherein N, M and K are each an integer of at least 2, wherein the customizable filter in the web-based framework is reusable and is configured for customized use by an end-user at each end-user computer of multiple end-user computers for generating respective user-defined data collection tools specific to each user-defined computer, and wherein the server computer is remote from the multiple end-user computers;
  said processor transmitting, via the Internet, the web-based framework to one end-user computer of the multiple end-user computers; and
  after transmitting the web-based framework to the one end-user computer, said processor receiving, from the one end-user computer via the Internet, a user-defined data collection tool generated by the one end-user computer, said user-defined data collection tool comprising the table populated with measures at the N×M intersections, said measures being in accordance with a measure of a dependent variable selected by the end-user at the one end-user computer from the K dependent variables of the customizable filter, wherein the measure of the selected dependent variable is a concrete value of the selected dependent variable, wherein the measure populated at each intersection is a concrete value that is a function of the measure of the dependent variable selected from the customizable filter and the two independent variables characterizing each intersection, and wherein the user-defined data collection tool is specific to the one end-user computer and is customized for the data collection populated by the one end-user computer at each intersection due to the selection, by the end-user at the one end-user computer, of the dependent variable from the K dependent variables of the customizable filter.

2. The method of claim 1, wherein the first column further identifies a fixed dimension consisting of a constraint, and wherein the dependent variable for each intersection is a function of the two dependent variables characterizing each intersection subject to the constraint.

3. The method of claim 2, wherein the fixed dimension appears in the first column in each row of the M rows.

4. The method of claim 1, wherein at least one row of intersections in the array and/or at least one column of intersections in the array includes measures of different dependent variables selected by the end-user from the K dependent variables.

5. The method of claim 1, wherein the N×M intersections in the data collection tool includes measures of all of the K dependent variables.

6. The method of claim 1, wherein the K dependent variables consist of K independent species of a generic parameter, wherein the first row in the data collection tool includes a measure of a different species of the generic parameter for each of the N independent variables respectively distributed in the N columns, wherein the different species encompasses all of the K independent species, and wherein the different species for each of the N independent variables are with respect to the M independent variables collectively.

7. The method of claim 6, wherein N=2, M=2, and K=3, wherein the generic parameter is cost, wherein the K independent species of the generic parameter of cost are first costs, second costs, and third costs, and wherein the different species of the generic parameter of cost is total cost which encompasses the first costs, the second costs, and the third costs.

8. A computer system, comprising a server computer that includes a processor, a memory coupled to the processor, and a computer readable hardware storage device coupled to the processor, said storage device containing program code executable by the processor via the memory to implement a method, said method comprising:

said processor generating a web-based framework, wherein the web-based framework is a table comprising N+1 columns and M+1 rows, wherein the N+1 columns comprises a first column and N remaining columns, wherein the M+1 rows comprises a first row and M remaining rows, wherein the first row identifies N dimensions consisting of N independent variables respectively associated with the N columns, wherein the first column identifies M dimensions consisting of M independent variables respectively associated with the M rows, wherein a two-dimensional array within the table comprises N×M intersections of the N remaining columns and the M remaining rows, wherein each intersection is characterized by two independent variables consisting of the independent variable of the column and the independent variable of the row defining each intersection, wherein the first row further identifies a customizable filter comprising a list of K dimensions consisting of K dependent variables, wherein N, M and K are each an integer of at least 2, wherein the customizable filter in the web-based framework is reusable and is configured for customized use by an end-user at each end-user computer of multiple end-user computers for generating respective user-defined data collection tools specific to each user-defined computer, and wherein the server computer is remote from the multiple end-user computers;

said processor transmitting, via the Internet, the web-based framework to one end-user computer of the multiple end-user computers; and after transmitting the web-based framework to the one end-user computer, said processor receiving, from the one end-user computer via the Internet, a user-defined data collection tool generated by the one end-user computer, said user-defined data collection tool comprising the table populated with measures at the N×M intersections, said measures being in accordance with a measure of a dependent variable selected by the end-user at the one end-user computer from the K dependent variables of the customizable filter, wherein the measure of the selected dependent variable is a concrete value of the selected dependent variable, wherein the measure populated at each intersection is a concrete value that is a function of the measure of the dependent variable selected from the customizable filter and the two independent variables characterizing each intersection, and wherein the user-defined data collection tool is specific to the one end-user computer and is customized for the data collection populated by the one end-user computer at each intersection due to the selection, by the end-user at the one end-user computer, of the dependent variable from the K dependent variables of the customizable filter.

9. The computer system of claim 8, wherein the first column further identifies a fixed dimension consisting of a constraint, and wherein the dependent variable for each intersection is a function of the two dependent variables characterizing each intersection subject to the constraint.

10. The computer system of claim 9, wherein the fixed dimension appears in the first column in each row of the M rows.

11. The computer system of claim 8, wherein at least one row of intersections in the array and/or at least one column of intersections in the array includes measures of different dependent variables selected by the end-user from the K dependent variables.

12. The computer system of claim 8, wherein the N×M intersections in the data collection tool includes measures of all of the K dependent variables.

13. A computer program product, comprising a computer readable hardware storage device having computer readable program code stored therein, said program code containing instructions executable by a processor of a server computer of a computer system to implement a method, said method comprising:

said processor generating a web-based framework, wherein the web-based framework is a table comprising N+1 columns and M+1 rows, wherein the N+1 columns comprises a first column and N remaining columns, wherein the M+1 rows comprises a first row and M remaining rows, wherein the first row identifies N dimensions consisting of N independent variables respectively associated with the N columns, wherein the first column identifies M dimensions consisting of M independent variables respectively associated with the M rows, wherein a two-dimensional array within the table comprises N×M intersections of the N remaining columns and the M remaining rows, wherein each intersection is characterized by two independent variables consisting of the independent variable of the column and the independent variable of the row defining each intersection, wherein the first row further identifies a customizable filter comprising a list of K dimensions consisting of K dependent variables, wherein N, M and K are each an integer of at least 2, wherein the customizable filter in the web-based framework is reusable and is configured for customized use by an end-user at each end-user computer of multiple end-user computers for generating respective user-defined data collection tools specific to each user-defined computer, and wherein the server computer is remote from the multiple end-user computers;

said processor transmitting, via the Internet, the web-based framework to one end-user computer of the multiple end-user computers; and after transmitting the web-based framework to the one end-user computer, said processor receiving, from the one end-user computer via the Internet, a user-defined data collection tool generated by the one end-user computer, said user-defined data collection tool comprising the table populated with measures at the N×M intersections, said measures being in accordance with a measure of a dependent variable selected by the end-user at the one end-user computer from the K dependent variables of the customizable filter, wherein the measure of the selected dependent variable is a concrete value of the selected dependent variable, wherein the measure populated at each intersection is a concrete value that is a function of the measure of the dependent variable selected from the customizable filter and the two independent variables characterizing each intersection, and wherein the user-defined data collection tool is specific to the one end-user computer and is customized for the data collection populated by the one end-user computer at each intersection due to the selection, by the end-user at the one end-user computer, of the dependent variable from the K dependent variables of the customizable filter.

14. The computer program product of claim 13, wherein the first column further identifies a fixed dimension consisting of a constraint, and wherein the dependent variable for each intersection is a function of the two dependent variables characterizing each intersection subject to the constraint.

15. The computer program product of claim 14, wherein the fixed dimension appears in the first column in each row of the M rows.

16. The computer program product of claim 13, wherein at least one row of intersections in the array and/or at least one column of intersections in the array includes measures of different dependent variables selected by the end-user from the K dependent variables.

17. The computer program product of claim 13, wherein the N×M intersections in the data collection tool includes measures of all of the K dependent variables.

* * * * *